United States Patent [19]

Fitzsimmons

[11] 4,360,813

[45] Nov. 23, 1982

[54] POWER COMBINING ANTENNA STRUCTURE

[75] Inventor: George W. Fitzsimmons, Lynnwood, Wash.

[73] Assignee: The Boeing Company, Seattle, Wash.

[21] Appl. No.: 131,664

[22] Filed: Mar. 19, 1980

[51] Int. Cl.³ .......................................... H04B 7/00

[52] U.S. Cl. .............................. 343/100 R; 343/770

[58] Field of Search .................. 343/100 R, 767, 768, 343/770, 771

[56] References Cited

U.S. PATENT DOCUMENTS

| | | | |
|---|---|---|---|
| 3,665,480 | 5/1972 | Fassett | 343/754 |
| 3,757,344 | 9/1973 | Pereda | 343/770 |
| 3,832,716 | 8/1974 | Plunk et al. | 343/770 |
| 3,921,177 | 11/1975 | Munson | 343/846 |
| 3,972,049 | 7/1976 | Kaloi | 343/829 |
| 3,978,488 | 8/1976 | Kaloi | 343/829 |

*Primary Examiner*—Theodore M. Blum
*Attorney, Agent, or Firm*—Christensen, O'Connor, Johnson & Kindness

[57] ABSTRACT

Low-loss power combining-transmitting antenna arrangements are disclosed which are suitable for use in power distribution systems employing RF transmission of the energy being distributed and other applications in which it is necessary to coherently combine and transmit several RF signals. The disclosed arrangements utilize slot radiators that are excited at each end by separate feed lines. Narrow, nonradiating slots extend outwardly from the ends of each radiating slot to provide impedance matching. One modular arrangement includes amplifier circuitry for supplying the antenna excitation signals and phase error correction circuits for maintaining proper signal phase through the antenna module.

14 Claims, 7 Drawing Figures

POWER COMBINING ANTENNA STRUCTURE

BACKGROUND OF THE INVENTION

This invention relates to electrical power distribution systems wherein electrical energy generated at one location is transmitted to another location as an electromagnetic wave. More specifically, this invention relates to antenna structure in which the operation of combining or summing the electrical energy supplied by a plurality of power sources and the operation of radiating substantially the total energy supplied by those power sources are both effected within and by a compact module that defines the antenna.

Various arrangements have been proposed for the transfer of electrical power from a first location at which electrical energy is readily generated to a second, substantially remote location that requires electrical power wherein the energy is transmitted as an electromagnetic wave that propagates between the first and second locations. For example, power generating and distribution systems have been proposed wherein solar cells convert solar radiation to a DC electrical signal that is used (either directly or after accumulation and storage within batteries or other such devices) to power electronic circuitry that generates and transmits the desired electromagnetic (RF) signal. In such a solar power system and a majority of the other systems which employ electromagnetic radiation as the means for electrical power transfer, one or more oscillator circuits are utilized to generate an electrical signal at the desired frequency of transmission; the signal power is greatly increased through the use of power amplifier circuits; and the resultant high power signal is coupled to and radiated by one or more antennas.

One problem associated with generating and transmitting electrical power in this manner results from the limited power handling capability of the power amplifier stages. In particular, and especially in those systems utillizing solid-state (i.e., semiconductor) circuitry, the electrical signal power that must be supplied to the transmitting antenna in order to establish an electromagnetic field of suitable intensity greatly exceeds the power handling capability of presently available power amplifiers. This situation exists even when the transmitting antenna is a large array of antenna elements since the power handling capability of each antenna element of such an array substantially exceeds the power handling capabilities of a semiconductor amplifier that is configured for highly efficient operation.

To avoid the potential limitation posed by limited power handling capabilities of the amplifier stage, most prior art systems employ a corporate feed arrangement in which the electrical signal power provided by the system oscillator is split or divided to supply input signals to a large number of power amplifiers. The amplified signals provided by the numerous power amplifier circuits are then coherently combined or summed within subsequent circuit stages or devices to provide a high power signal that is coupled to the transmitting antenna structure. This technique, although satisfactory in some situations, exhibits several significant disadvantages and drawbacks. Specifically, although the necessary corporate feed and signal combining apparatus can be realized with combinations of various devices such as hybrid networks and other types of power splitters and power dividers, the resulting system configuration is often relatively complex in topology or geometry; is relatively large and heavy; and, hence, is often costly. Of even greater importance, such an arrangement reduces sytem efficiency and can compromise other system performance characteristics. First, with respect to system efficiency, each device or network that must be added to the system to recombine the amplified signals causes loss of signal power due to impedance mismatch, conduction ($I^2R$) loss, loss within the dielectric material of various types of devices that may be employed and radiation loss from exposed or unshielded portions of such arrangements. With respect to various other sytem performance characteristics, the insertion phase variation between power amplifiers and between corporate power combining components often makes it extremely difficult or impossible to control the phase of the signals being combined to the degree desired or even necessary. This not only causes further degradaton of system efficiency because the signals are not in total coherence but can also deleteriously affect the directional characteristics of the antenna pattern, should significant undesirable phase shift occur relative to the signals supplied to various elements of a transmitting array.

The above-mentioned disadvantages and drawbacks of an electrical power distribution system that utilizes a plurality of amplifiers and the prior art corporate feed and power combining techniques become especially important and critical relative to one type of recently proposed solar-powered electrical transmission system. In particular, because electromagnetic energy passes through the earth's atmosphere and blanketing cloud cover with far less attenuation than does solar energy and because solar panels on the surface of the earth receive energy only during daylight hours, there has been substantial interest in establishing a synchronous satellite having a large array of solar panels and a large microwave antenna array for beaming the produced electromagnetic energy to earth. Obviously, the above-mentioned factors of reliability, cost, size and weight of the various system components play a major role in determining the practicality of such a system. Further, because of the relatively high power output of such a system and the narrow beam radiation pattern that is required, an antenna array occupying a relatively large area and having a very large number of elements is required. To provide ease of assembly and potential servicibility, it is generally desirable to construct such an array as a plurality of identical units or modules that are structurally and electrically interconnected.

Accordingly, it is an object of this invention to provide a transmitting antenna and power combining arrangement suitable for use in a power transmission system wherein a plurality of relatively high frequency signals are combined and transmitted as an electromagnetic wave.

It is another object of this invention to provide a unitary transmitting antenna-power combining arrangement that is relatively simple in topology and structure and can thus be manufactured at a relatively low cost.

It is yet another object of this invention to provide unitary transmitting antenna-power combining structure that exhibits relatively low power loss (i.e., high efficiency) while simultaneously being relatively small in size and light of weight.

It is still a further object of this invention to provide transmitting antenna-power combining apparatus of the above-described type that is suited for use in forming the power combining-transmitting array within the DC-RF conversion system of a synchronous satellite which transmits electrical power to the earth.

Still further, it is an object of this invention to provide unitary transmitting antenna-power combining structure of the above-described type which is structured in modular form to thereby allow ready assemblage of a large transmitting array.

Even further, it is an object of this invention to provide unitary transmitting antenna-power combining module wherein the signals which are combined are provided by a plurality of solid-state power amplifiers that are contained within the module and additional circuitry is provided to maintain proper phase relationship throughout the entire arrangement.

SUMMARY OF THE INVENTION

These and other objects are achieved in accordance with this invention through the provision of an antenna module comprising a combined antenna arrangement and feed system therefore wherein the module is configured so that the signals provided by a plurality of individual signal sources are coherently combined or summed within and by the antenna radiating elements. More specifically, an antenna module constructed in accordance with this invention includes at least one radiating element that is driven by two separate signal sources. Each signal source is coupled to the radiating element by an associated coupling device wherein the two coupling devices excite separate spatially distinct regions of the radiator. In this regard, the spatial and electrical relationship between the two signal coupling devices and the radiator is established so that the coupling arrangement effects in-phase power summation of the supplied signals (or equivalently, the electrical field generated thereby) for a predetermined, easily attained phase difference between the two applied signals, e.g., 0° or 180°.

In each of the disclosed embodiments of the invention, a sheet of dielectric material serves as the substrate for both the antenna radiators and the signal coupling arrangements with each radiating element being a slot that extends along and through a conductive layer which is deposited or otherwise formed on one surface of the dielectric substrate. The coupling devices of these embodiments comprise microstrip transmission lines that are formed on the opposite surface of the dielectric substrate relative to the conductive surface layer that defines the slot radiators, with the microstrip transmission lines terminating in antenna excitation elements that extend beneath the oppositely disposed ends of the slot radiator. These excitation elements, which are formed as open-circuited quarter-wave sections of microstrip transmission line or various other lengths of conductive structure, are coupled to the slot radiator through the dielectric substrate and hence are individually capable of energizing or exciting the slot radiator. When excited in-phase with one another, the slot radiates at the combined power level of both excitaton signals. To provide optimum impedance matching between the microstrip transmission line and its associated excitation element, a relatively narrow slot, having a length much less than one-quarter wavelength, extends outwardly from each end of each slot radiator.

To provide the unidirectional radiation pattern that is necessary in the previously-discussed power transmission systems, a conductive shell is mounted to the dielectric substrate so as to form a cavity wherein the slot radiator extends along one of the outer boundaries of the cavity. The conductive shell is physically and electrically joined to a conductive border region that is deposited or otherwise formed on the surface of the dielectric substrate that includes the signal coupling or antenna feed arrangement. The conductive border is electrically connected to the antenna ground plane (i.e., the conductive surface layer including the slot radiator) by a conductive layer or "wrap-around" ground that is deposited or otherwise formed on the edge surface of the dielectric substrate.

The presently preferred modular embodiments of the invention include two substantially identical slot radiators that are formed in one conductive surface of a metal-clad dielectric substrate with the slots being parallel to one another. In this embodiment, the nonradiating, narrow slots are less than one-quarter wavelength long and extend orthogonally from each end of the slot radiators. Preferably, the slot radiators (wide slots) are spaced apart by approximately one-half wavelength, relative to the propagation velocity in free space, and the narrow slots extend toward another.

In this preferred embodiment, the two-slot radiators are coupled together primarily via a common cavity that is formed by a conductive shell that is mounted to the dielectric substrate. Propagaton within the cavity takes place in $TE_{10}$ mode (the lowest order mode commonly used in rectangular wave guide).

Like the excitation arrangement of the single slot radiator, the antenna feed arrangement of these presently preferred embodiments include microstrip transmission lines that enter the cavity that is formed behind the slot radiators through small openings with the transmission lines being terminated by quarter wave open-circuited exciter elements of a hook-like or folded geometry which are positioned adjacent to and below an end region of the slot radiators. Further, to provide a substantially self-contained unit having near optimal performance characteristics, these presently preferred embodiments of the invention include semiconductor amplifier circuitry that is reponsive to a single input signal and supplies an electrical signal to each of the four excitation elements. Additionally, these embodiments of the invention include a phase error correction loop wherein the signal being radiated by the antenna module is sampled and utilized to control the signal phase supplied to each of the slot radiators in a manner which maintains a constant and proper relationship between the signals that drive the slot radiators. In the disclosed configuration of this phase error correction arrangement, the signal being radiated is sampled by means of a small microstrip probe that extends into the antenna cavity. The signal sample and the module input signal are coupled to a phase detector which produces a DC error signal representative of the phase difference between these two signals. The DC error signal is used to control a phase shifter which couples the applied signal to each power amplifier that feeds the two-slot radiators, to thereby phase-lock the input and output signals.

BRIEF DESCRIPTION OF THE DRAWING

Other objects and advantages of the present invention will become apparent to one skilled in the art after reading the following description taken together with the accompanying drawings in which.

DETAILED DESCRIPTION

Figure 3:
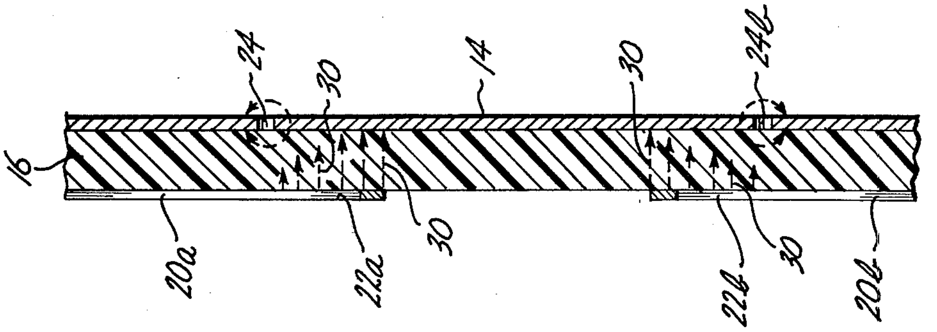
FIG. 3 is a sectional view taken along the lines 3—3 of FIG. 2, which is useful in understanding the manner in which the two separate excitation signals are, in effect, combined.
Figure 2:
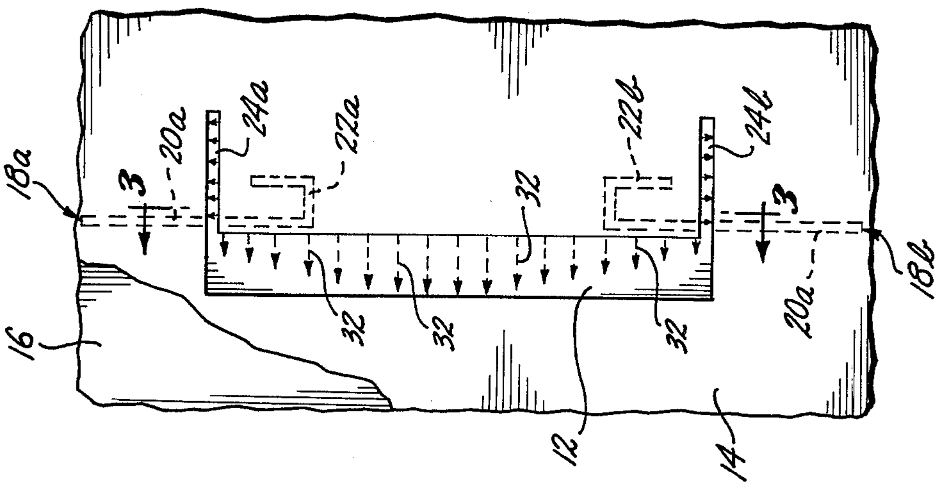
FIG. 2 is a partial plan view of the embodiment of FIG. 1, which provides a more detailed depiction of the slot radiator and coupling arrangement of this invention.
Figure 1:
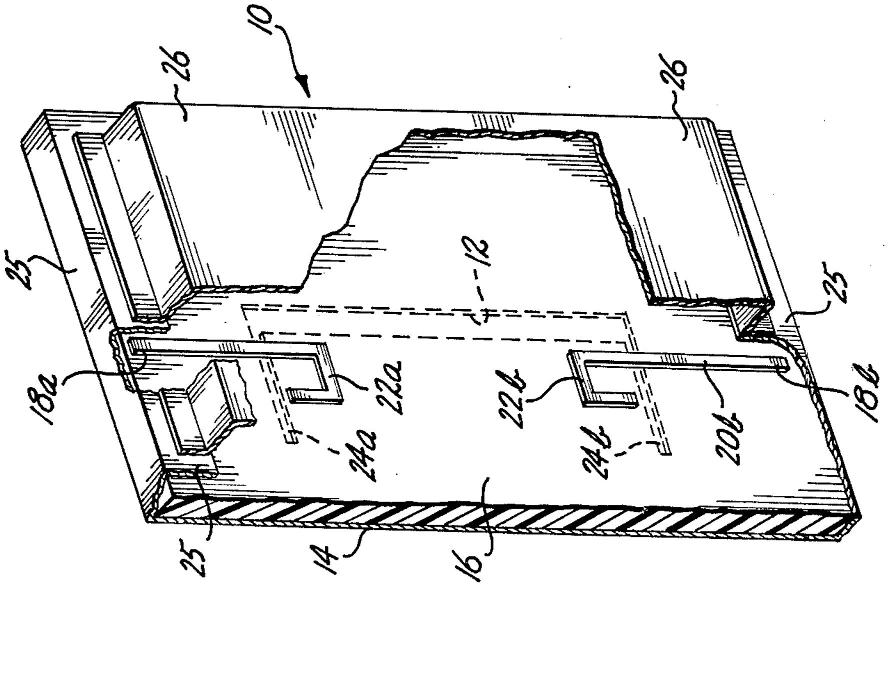
FIG. 1 is a partially cut-away isometric view of a modular embodiment of the invention which depicts a single-slot radiator and the associated signal coupling arrangement that permits excitation of the slot radiator by two separate coherent signal sources to establish electromagnetic radiator at a power level substantially corresponding to the total power level of the two applied excitation signals.

Referring first to FIGS. 1–3, a single radiator embodiment of this invention (generally denoted by the numeral 10) includes a slot radiator 12 that is formed in a conductive sheet or layer 14 which extends across one surface of a dielectric substrate 16. In this regard, those skilled in the microwave transmission art will recognize that one advantageous manner of forming the slot 12 and the hereinafter-described additional conductive regions located on the substrate 16 is through the use of conventional printed circuit fabrication techniques.

Regardless of the fabrication technique employed, conductive antenna feed lines **18*a* and 18*b* are located on the second surface of dielectric substrate 16, extending inwardly from oppositely disposed edges thereof and being substantially parallel to the slot radiator 12. More specifically, the antenna feed lines 18*a* and 18*b* are microstrip transmission lines that extend beneath the end regions of slot radiator 12 with the outermost boundary edge of each feed line 18*a* and 18*b* being in substantial alignment with the innermost boundary of slot radiator 12. For purposes of clarity in description and ease of understanding, that portion of feed lines 18*a* and 18*b* that lie substantially outside the end boundaries of slot radiator 12 are referred to as microstrip transmission lines 20*a* and 20*b* whereas those portions of the feed lines 18*a* and 18*b* that are positioned beneath the longitudinal boundary edge of slot radiator 12 are referred to as antenna excitation elements 22*a* and 22*b*, respectively. As is shown in the drawings, the depicted excitation elements 22*a* and 22*b* are of substantially J-shaped geometry, including a first section that extends substantially parallel to the slot radiator 12, a second conductive region that extends orthogonally away from the slot radiator and a third section that extends substantially parallel to the slot radiator. As is further illustrated in FIGS. 1 through 3, conductive surface layer 14 also includes two relatively thin slots 24*a* and 24*b* that extend inwardly from the oppositely-disposed ends of slot radiator 12. In the depicted arrangement the narrow slots 24*a* and 24*b* are substantially colinear with the imaginary line of demarcation between the microstrip transmission lines 18*a* and 18*b* and the associated antenna excitation elements 22*a* and 22*b***.

As is illustrated in FIG. 1, the surface of dielectric substrate 16 which includes the conductive antenna feed lines **18*a* and 18*b* also includes a conductive strip 25 of a rectangular or other geometry that completely encompasses the region that contains slot radiator 12. As is also shown in FIG. 1, conductive strip 25 is electrically connected to conductive surface layer 14, which is located on the opposite side of dielectric substrate 16 and forms the antenna ground plane, via a conductive region 27 that is plated or otherwise formed on the edge surface of dielectric substrate 16. This configuration allows a conductive shell 26 that is structurally and electrically joined to the conductive strip 25 to fully enclose the slot radiator 12 and define a cavity on that side of the substrate 26 that includes antenna feed lines 18*a* and 18*b*. Feed lines 18*a* and 18*b* enter the cavity through an opening 28 formed in both conductive strip 25 and a contiguous region of cavity shell 26**.

In the embodiment of FIGS. 1 through 3, as well as other embodiments in the invention utilizing a similar arrangement that includes a slot radiator and antenna feed lines that basically comprise quasi-TEM transmission line, the transmission lines, e.g., microstrip transmission lines **20*a* and 20*b*, are configured so as to exhibit a characteristic impedance which matches that of the system signal source and its associated distribution network (e.g., 50-ohm systems are commonly employed). Slot radiator 12 is configured for resonance at the desired frequency, but is generally somewhat shorter than the theoretical one-half wavelength (or an integer multiple thereof) so as to present a suitable impedance to the antenna excitation elements 22*a* and 22*b*. In this regard, the slots 24*a* and 24*b* are relatively narrow in width to prevent substantial radiation therefrom and exhibit a length that provides optimal impedance match between the slot radiator 12 and the antenna feed lines 18*a* and 18*b***. Generally, a length of much less than one-quarter wavelength has been found to be the most satisfactory.

The width of the slot radiator 12 is established to provide maximum radiation (i.e., present a radiation impedance substantially matching that of free space) while simultaneously providing sufficient bandwidth so that system insertion loss will remain within an acceptable range relative to permissible frequency deviation in the signal skupplied to feed lines **18*a* and 18*b* or relative to manufacturing tolerances that apply to fabrication of the antenna assembly. In this regard, those skilled in the art will recognize that complex interrelationships exist between the physical dimensions of the above-discussed components and that emperical determination of the most advantageous combination of dimensional values may be required or desired. For example, it has been found that the length of the narrow, nonradiating slots 24*a* and 24*b* can be adjusted when additional system tuning is required to achieve the final impedance matching without restructuring the slot radiator 12. With further regard to the dimensional considerations of the invention, those of ordinary skill in the art will recognize that dielectric substrate 16 should exhibit a low loss tangent and that the dielectric constant thereof is a factor that partially determines the length and width of the various components. In a similar manner, those skilled in the art realize that the length and depth of the cavity defined by conductive shell 26** (typically one-quarter wavelength or less for each of the slots) will affect various dimensional considertions relative to obtaining desired electrical characteristics such as the center frequency for the radiator or the required characteristic impedance presented to the antenna feed lines.

With the above-discussed structure and physical relationships in mind, energization of the slot radiator 12 by antenna feed lines 18*a* and 18*b* can be understood with particular reference to FIGS. 2 and 3. First, as is shown in FIG. 3, since the depicted excitation elements 22*a* and 22*b* correspond to open-circuited one-quarter wavelength transmission lines, an electrical standing wave pattern or field (denoted by dashed arrows 30) is established within dielectric substrate 16 with the electric field having maximum value at the innermost end of the excitation elements 22*a* and 22*b* and having minimum value at the interface between each excitation elements 22*a* and its associated microstrip transmission lines (20*a*, 20*b*). This minimum field value may be looked upon as defining a point of relatively low impedance. Thus, the microstrip line is, in effect, shorted to the grpound plane formed by conductive layer 14 and the incoming signal can be considered as being impressed across the narrow slots 24*a* and 24*b*. In this regard, if the signals provided to excitation elements 22*a* and 22*b* are in the phase with one another, the electrical field distribution established within dielectric substrate 16 varies with a frequency determined by the frequency of the applied signal and corresponds to that depicted in FIG. 3.

The above-described electric field that is established within the dielectric substrate 16 by the drive signals applied to excitation elements 22*a* and 22*b* establishes a standing wave electrical field within the slot radiator 12 with substantially the field distribution depicted by dashed arrows 32 of FIG. 2. This standing wave pattern is the resultant or sum of the electrical fields caused by two slot line signals introduced at opposite ends of the radiating slot and phased to yield a maximum field of the center of the slot. This field distribution is substantially identical to (and thus equivalent to) the field established in a slot radiator that is center-fed by a two-wire transmission line having the conductors electrically connected to the opposite boundary edges of the slot. Further, as is known in the art, an identical field pattern is obtained with resonant dipole structure, except that the E and H fields associated with a slot radiator respectively correspond to the H and E fields established by a resonant dipole. In any case, it can thus be recognized that the slot radiator 12 supplies a linearly polarized electromagnetic field substantially identical to that supplied by conventionally excited dipoles and slots. Further, since both of the signals supplied to the antenna feed lines 18*a* and 18*b* contribute to the field established within the dielectric 16 and across the slot radiator 12, power summation is effected. Thus, with the slot 12, feed lines 18*a* and 18*b* and the cavity dimensioned and arranged in the previously-mentioned manner, extremely low loss signal combining and radiation is effected within a substantially unitary structure.

Figure 4:
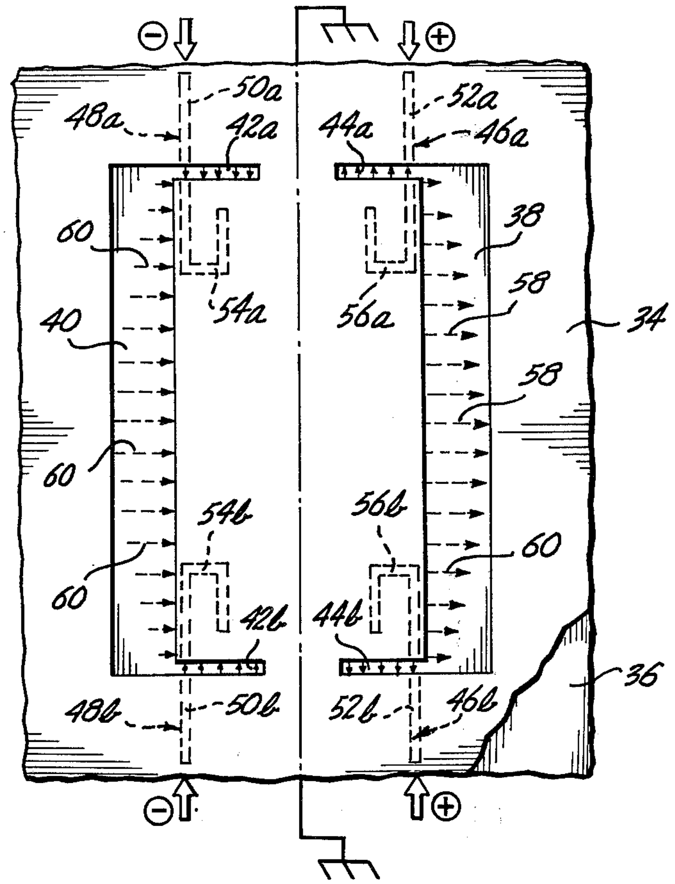
FIG. 4 illustrates suitable slot radiator and coupling geometry for an embodiment of the invention that employs two radiating elements.
Figure 5:
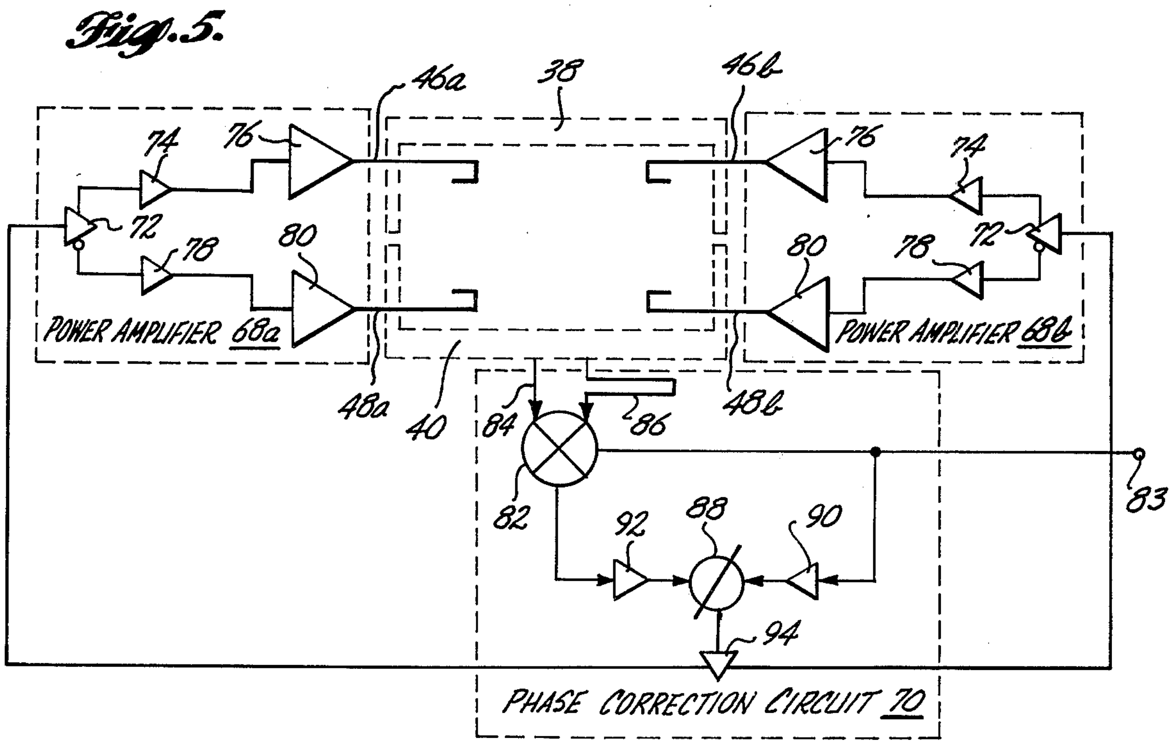
FIG. 5 is a block diagram representation of amplifier and phase correction circuitry for an embodiment employing the two-slot radiator geometry that is depicted in FIG. 4.
Figure 6:
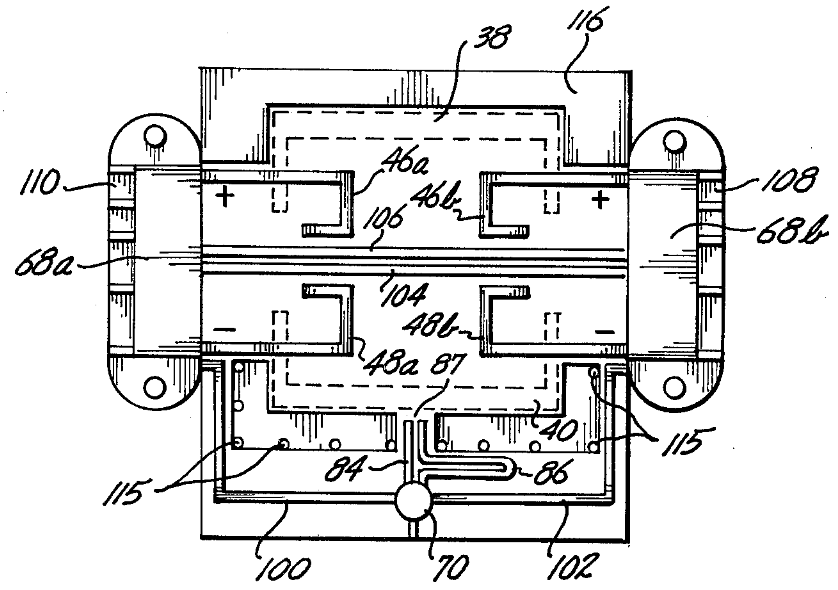
FIG. 6 depicts a conductive pattern suitable for use in a realization of the arrangement depicted in FIG. 4 and 5.

Turning now to FIGS. 4 through 7, the presently preferred embodiment of the invention utilizes two-slot radiators and associated feed lines wherein each slot radiator is similar to the above-discussed single radiator arrangement with the two slots of the presently preferred embodiment in effect being mirror images of one another about an imaginary centerline. More specifically, and as is shown in FIGS. 4 and 6, the conductive surface 34 of the dielectric substrate 36 of this embodiment includes two equal length, spaced apart slot radiators 38 and 40 that are substantially parallel to one another. In the depicted arrangement, relatively narrow, nonradiating slots 42*a* and 42*b* extend orthogonally from the ends of slot 38 and relatively narrow, nonradiating slots 44*a* and 44*b* extend orthogonally from the ends of slot 40 and toward (i.e., colinear with) the slots 42*a* and 42*b*. Thus, when viewed from the face including conductive surface layer 34, the radiating aperture of this embodiment of the invention forms a somewhat rectangular pattern wherein the slot radiators 38 and 40 define the mutually opposite major boundary edges and the nonradiating, narrow slots 42 and 44 extend along the minor boundaries.

With continued reference to FIG. 4, slot radiators 38 and 40 are respectively excited by a first pair of antenna feed lines 46*a*, 46*b* and a second pair of feed lines 48*a*, 48*b*, which are dimensioned and arranged in substantially the same manner as feed lines 18*a* and 18*b* of FIGS. 1 through 3. More specifically, each feed line 46*a*, 46*b* and 48*a*, 48*b* includes a microstrip transmission line (52*a*, 52*b* and 50*a*, 50*b*; respectively) and an antenna excitation element (56*a*, 56*b* and 54*a*, 54*b*; respectively) that is formed on the surface of dielectric substrate 38 that lies opposite to the conductive layer 34. Like the previously-described single slot embodiment of the invention, excitation elements 54*a*, 54*b* and 56*a*, 56*b* are each directly opposite a portion of the conductive surface layer 34 that defines the terminal portion of one boundary edge of the associated slot radiator 38 or 40.

In view of the above-described geometry, it can be recognized that, when feed lines 46 and 48 are properly excited, slot radiators 38 and 40 function in a manner substantially identical to slot 12 of FIGS. 1 through 3. More specifically and with reference to excitation of slot 40, since excitation elements 54*a* and 54*b* are substantially one-quarter of a wavelength and are open-circuited, a time-varying E field will be induced in the narrow slots 42*a* and 42*b*, which will propagate along slot 40 and yield the desired standing wave pattern with slot 40 (denoted by the dashed arrows 60 in FIG. 4). As previously-described, as long as the signals supplied to excitation elements 54*a* and 54*b* are in-phase with one another (this in-phase relationship being denoted by the adjacent feed lines 48*a* and 48*b* in FIG. 4), slot 40 will supply electromagnetic radiation substantially identical to that supplied by a conventionally excited resonant slot radiator. Since slot 38 operates in the same manner when in-phase signals are supplied to excitation elements 56*a* and 56*b*, simultaneous excitation of slot radiators 38 and 40 establishes an electromagnetic field that substantially represents the sum of the supplied signals. In this regard, as is indicated in FIG. 4, if the excitation signals supplied to feed lines 48*a* and 48*b* of slot radiator 40 are in phase with one another but in phase opposition (180° out-of-phase) with the signals supplied to feed lines 46*a* and 46*b* of slot radiator 38, the component vectors of the E field established across slot radiator 40 (dashed arrows 60 in FIG. 4) will be equal in magnitude and have the same directional sense as the corresponding component vectors of the E field of slot radiator 38 (indicated by dashed arrows 58 in FIG. 4). Under such conditions, the combined electromagnetic radiation of slots 38 and 40 will exhibit a power level that substantially corresponds to the signal power of the four separate signals supplied to feed lines 46*a*, 46*b* and 48*a*, and 48*b*.

As is schematically depicted in FIG. 5, the presently preferred embodiment of the invention also includes amplifier circuitry for developing the four signals that drive slots 38 and 40 from a single signal source and includes a phase error correction circuitry for ensuring that the electromagnetic radiation supplied by slots 38 and 40 is properly phased relative to the system input signal. More specifically, in the arrangement of FIG. 5, feed lines 46*a* and 48*a* and feed lines 46*b* and 48*b* are supplied drive signals by identically configured amplifier stages 68*a* and 68*b*. As is shown in the drawing, each amplifier 68*a* and 68*b* receives an input signal from phase correction circuit 70 and includes an input stage 72 that provides both an inverted and noninverted input signal. This establishes that necessary phase relationship for the signals that are supplied to feed lines 46*a* and 48*a* (in the case of amplifier 68*a*) and are supplied to feed lines 46*b* and 48*b* (by amplifier 68*b*). Amplifier stages 74 and 76, which are connected in cascade between the noninverting output terminal of amplifier stage 72 and an antenna feed line 46*a* or 46*b* of slot radiator 38 and amplifier stages 78 and 80, which are connected in cascade between the inverting output terminal of amplifier stage 72 and the respective feed line 48*a* or 48*b* of slot radiator 40, supply the required power gain.

Phase error correction circuit 70 of FIG. 5 is similar in some respects to circuit arrangements commonly known as phase-locked loops and includes a phase detector 82 having one input terminal thereof connected for receiving a system input signal that is applied to a terminal 83. Phase detector 82 is a conventional device such as a diode-type phase detector having two additional input ports that are connected in the arrangement of FIG. 5 for receiving a signal representative of the radiation being supplied by the slot radiators 38 and 40. More specifically, in accordance with this invention, the electromagnetic energy within the cavity that surrounds slots 38 and 40 is sampled by two small transmission lines 84 and 86 that enter the cavity through an opening 87 (FIG. 6) in a conductive boundary strip similar to conductive strip 25 of the embodiment described relative to FIG. 1. As is schematically indicated in FIGS. 5 and 6, microstrip transmission line 86 is one-half wavelength longer than microstrip transmission line 84 so that the signals supplied to phase detector 82 via microstrip transmission lines 84 and 86 are 180° out-of-phase with one another.

In this arrangement, the phase detector 82 thus supplies a DC error signal indicative of the phase difference between the system input signal applied to terminal 83 and the signal phase within the cavity surrounding slots 38 and 40 (i.e., the phase of the radiated signal), with the sign or polarity of the DC error signal supplied by phase detector 82 being representative of whether the input signal leads or lags the signal being supplied to slot radiators 38 and 40. To maintain the desired phase relationship between the input signal and the signal being radiated, the system input signal is supplied to one input port of a variable phase shifter 88, via an amplifier stage 90 and the DC error signal supplied by phase detector 82 is supplied to the control port of the phase shifter 88 via a conventional low-pass filter stage 92. Phase shifter 88 is a conventional device, such as those employing varactor diodes as the tunable reactance element, and is connected in the arrangement of FIG. 5 to supply the phase-corrected signal to an amplifier stage 94. Amplifier 94 is connected for supplying signals of identical phase to the input terminals of the previously-discussed power amplifiers 68*a* and 68*b*.

Figure 7:
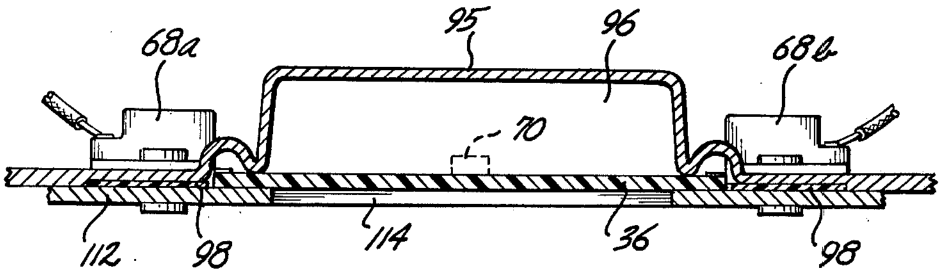
FIG. 7 is a cross-sectional side view of a module constructed in accordance with the invention, illustrating installation within a large scale array of such modules.

With reference to FIGS. 6 and 7, those skilled in the art will recognize that the circuit arrangement of FIG. 5 is most advantageously realized as one or more integrated circuits with each of the necessary circuit interconnections being formed as microstrip transmission line. For example, one of the frequencies of transmission proposed for previously-mentioned solar power satellite system is 2.45 Gigahertz, thus necessitating microstrip or other types of TEM transmission lines. In the proposed solar satellite system, the signal supplied to the terminal 83 would typically exhibit a power level of approximately 1 to 10 milliwatts and each power amplifier 68*a* and 68*b* is configured for a 30 dB power gain. Although both bipolar and unipolar circuitry can be utilized at this frequency and power level, realizing phase error correction circuit 70 and power amplifiers 68*a* and 68*b* with integrated circuits employing GaAs field-effect transistors are presently preferred since such devices exhibit both higher gain and higher power added efficiencies than silicon bipolar devices. In addition, it is believed that field-effect transistors may provide a higher reliability factor than that provided by bipolar technology since field-effect transistors of this type exhibit a negative temperature coefficient of resistance that prevents or inhibits the onset of thermal runaway.

Regardless of whether bipolar or field-effect technology is employed, power amplifiers 68*a* and 68*b* operate at high efficiency and are formed as integrated circuits that are mounted to the antenna module in the manner depicted in FIGS. 6 and 7. In particular, each amplifier module 68*a* and 68*b* is contained in a conventionally configured, hermetically sealed metal enclosure or canister and is mounted to the boundary surface of the metal ground plane 112 that supports the dielectric substrate 36. In most situations, the metal housing or canister of the integrated circuits is at an electrical potential equal to the supply potential and a thermally conductive dielectric pad 98 is installed between the power amplifiers 68*a* and 68*b* and the metal ground plane 112, which is at ground potential.

As can be seen in FIG. 6, the metalization pattern on the opposite side of the dielectric substrate 36 (i.e., the side including the antenna feed lines 46 and 48) also includes the previously-mentioned microstrip transmission lines 84 and 86 that supply signals to phase detector 82 (FIG. 5) and includes microstrip transmission lines 100 and 102 that respectively couple the signal supplied by phase correction circuit 70 (FIG. 5) to power amplifier 68*a* and 68*b*. In addition, DC conductive paths 104 and 106 interconnect power amplifiers 68*a* and 68*b* to thereby provide both power amplifiers with a DC operating potential that is applied to the depicted antenna module via terminals 108 and 110. As is further indicated in FIGS. 6 and 7, phase error correction circuit 70 is preferably realized in integrated circuit form and is mounted to the antenna module on the surface of the dielectric substrate 36 which includes conductive shell 95.

With reference to FIG. 7, large scale arrays of the antenna modules of this invention are easily formed by utilizing a conductive plate 112 having a plurality of spaced apart apertures 114 that are preferably slightly smaller in size than the region defined by conductive shell 95 (i.e., the surface area of cavity 96.) In this arrangement, each substrate 36 is placed over an opening 114. The conductive shell 95 and power amplifiers 68*a* and 68*b* are then mounted to the plate 112 in a manner which fastens and retains the entire antenna module. For example, in the arrangement depicted in FIGS. 6 and 7, conventional fasteners such as rivets extend through aligned openings in the power amplifiers 68, conductive shell 95 and plate 112. As is indicted in FIG. 7, the conductive shell 95 is maintained in electrical contact with the surface of the dielectric substrate 36 which includes the antenna feed lines 46 and 48 being electrically attached to the conductive border region 116 (FIG. 6). As was described relative to the embodiment of FIGS. 1–3, electrical contact to the conductive surface layer 34 (antenna ground plane) is provided via "wrap-around grounds" or conductive plating on the edge surfaces of dielectric substrate 36. Alternatively, as shown in FIG. 6, plated-through conductive holes 115 may be employed.

Those skilled in the art will recognize that the embodiments of the invention disclosed in the FIGURES and discussed herein are exemplary in nature and that various alterations and modifications can be made without exceeding the scope and the spirit of the invention. For example, and as previously-mentioned, the antenna excitation elements 22, 54 and 56 discussed herein may be realized by other conductor arrangements, including a simple conductive tabular region that extends along the end region of the slot radiator. Further, with respect to the embodiment depicted in FIGS. 4 through 7, the narrow, nonradiating slots 42*a*, 42*b* and 44*a*, 44*b* can be configured as two continuous narrow slots that extend between slots 38 and 40 thus attaining minimum spacing between slot radiators 38 and 40. Configuring the invention in such a manner requires that the depth of cavity 96 of FIG. 7 be equal to or nearly equal to one-quarter wavelength, whereas use of separate slots 42*a*, 42*b* and 44*a*, 44*b* allows a substantially shallower cavity.

With continued reference to the embodiment of the invention depicted in FIGS. 4–7, the power amplifier 68*a* and 68*b* could be configured so that each power amplifier energizes the opposite ends of a single slot radiator (slot raditor 38 or 40 of the depicted embodiment). In this regard, the embodiment of FIGS. 4 through 7 is the presently preferred embodiment in that configuring the power amplifiers 68*a* and 68*b* and the narrow, nonradiating slots 42 and 44 in the above-described manner permits the antenna module to maintain the best operation possible under conditions in which a portion of the circuitry fails. For example, if one of the amplifier stages 74, 76, 78 or 80 of such an embodiment fails, a certain amount of signal coupling occurs between the slot radiators 38 and 40 because of signal coupling through the common cavity 96. Thus, although normal energization current would not flow in at least one of the excitation elements under such conditions, both slots 38 and 40 would continue to radiate electromagnetic energy at a somewhat degraded power level and with a certain degree of skew in the radiation pattern.

The embodiments of the invention in which an exclusive property or privilege is claimed are defined as follows:

1. An antenna comprising:

at least one radiating element for supplying electromagnetic radiation in response to at least two separate applied electrical signals;

antenna feed means including at least two independently excitable antenna excitation elements positioned in operative association with each said radiating element of said antenna, each independently excitable excitation element that is associated with a particular radiating element being electronically coupled to a spatially distinct portion of that particular radiating element and being independently supplied with a different one of said applied signals, each such spatially distinct portion of said radiating element being selected to cause said radiating element to supply electromagnetic radiation of like polarization and like phase when each said associated independently excitable excitation element is independently supplied with an electrical signal of predetermined frequency and phase; and transmission line means for connecting each of said antenna excitation elements of said antenna feed means for receiving said applied electrical signals.

2. The antenna of claim 1 including a dielectric substrate and a conductive sheet, said conductive sheet extending across one surface of said dielectric substrate, said conductive sheet including an opening of predetermined length and width that defines each said radiating element as a slot radiator; each said excitation element including a conductive region positioned on the opposite surface of said dielectric substrate relative to said surface including said conductive sheet, each said conductive region defining said excitation element being positioned in substantial alignment with a portion of said conductive sheet that defines an end region of the particular slot radiator associated with said excitation element.

3. The antenna of claim 2 wherein said conductive sheet further includes first and second slots associated with and extending outwardly from each said slot radiator, said first and second slots being respectively interconnected with the first and second ends of the particular slot radiator associated therewith and having a width dimension substantially less than said predetermined width of each said slot radiator, the length of said first and second slots being established to provide an impedance match between said transmission line means and said antenna excitation elements.

4. The antenna of claim 3 further comprising a conductive shell mounted to said surface of said dielectric substrate that includes said conductive regions defining said antenna excitation elements, said conductive shell defining a cavity extending rearwardly from each said slot radiator, said conductive shell being electrically connected to said conductive sheet and being dimensioned and arranged to maximize the electromagnetic energy coupled to said slot radiators by said associated excitation elements.

5. The antenna of claims 1, 2, 3 or 4 wherein said transmission line means includes signal means for supplying electrical signals to each said excitation element in response to a single applied signal, said signal supply means including signal sampling means for supplying at least one signal that represents the electromagnetic radiation being supplied by said antenna; means for comparing the phase of said signal supplied by said signal sampling means with the phase of said single applied signal and phase shift means responsive to said means for comparing said phase for shifting the phase of said single applied signal to maintain a predetermined phase relationship between said single applied signal and said signal provided by said signal sampling means.

6. An antenna module for transmitting electromagnetic energy at a power level substantially corresponding to the total power of a plurality of applied signals, said antenna module including:

a conductive ground plane including at least one slot radiator formed therein, each said slot radiator having first and second longitudinal boundaries and first and second end boundaries;

feed line means including a first and second conductive excitation element for supplying electrical energy to each said slot radiator, each said first and second conductive excitation element being mounted in spaced apart juxtaposition with said conductive ground plane and respectively extending along one of said first and second longitudinal boundaries of said slot radiator at positions near said first and second end boundaries; and transmission line means responsive to said applied signals for separately coupling a first one of said applied signals to said first excitation element of each said slot radiator element and for separately coupling a second one of said applied signals to said second excitation element of each said slot radiator, said feed line means being dimensioned and arranged to supply said first and second signals to said first and second excitation elements in an inphase relationship.

7. The antenna module of claim 6 further comprising a dielectric substrate disposed between said conductive ground plane and said first and second conductive excitation elements, said substrate supporting said conductive ground plane and said conductive excitation elements on the oppositely disposed surfaces thereof, said transmission line means being defined by conductive strips that extend along said surface of said dielectric substrate that supports said conductive excitation elements, each said conductive strip being electrically connected to one of said first and second excitation elements.

8. The antenna module of claim 7 wherein said conductive ground plane further includes first and second impedance matching slots interconnected with each said slot radiator, said first and second impedance matching slots having a width dimension that is substantially less than the width dimension of said slot radiator with said first and second impedance matching slots respectively extending from said first and second end boundaries of the slot radiator associated therewith.

9. The antenna module of claim 8 further comprising a conductive shell mounted to said surface of said dielectric substrate that includes said excitation elements and said conductive strips that define said transmission line means, said conductive shell being electrically interconnected with said ground plane and being configured and arranged for forming a cavity that encompasses said slot radiators and extends rearwardly from said dielectric substrate.

10. The antenna module of claim 9 wherein said excitation elements each comprise a section of transmission line having a length substantially equal to one-quarter wavelength relative to said applied signals.

11. The antenna module of claim 10 wherein each said section of transmission line defining each said excitation element is a conductive strip having a first section extending substantially parallel to and along one of said first and second longitudinal boundaries of said slot radiator, a second section extending substantially orthogonal to said first section and away from said longitudinal boundary of said slot radiator and a third section extending substantially parallel to and spaced apart from said first section of said conductive strip forming said excitation element.

12. The antenna module of claims 6, 7, 8 or 9 further comprising:

amplifier means responsive to a single input signal, said amplifier means including circuit means for supplying each of said applied signals;

signal sampling means for providing a signal representative of said electromagnetic energy transmitted by said antenna module; and phase correction means including a variable phase shifter responsive to an applied control signal, said variable phase shifter being connected for coupling said single input signal to said amplifier means, phase detector means responsive to said signal supplied by said signal sampling means and responsive to said single applied input signal, said phase detector means supplying an error signal proportional to the phase difference between said single input signal and said signal supplied by said signal sampling means, said error signal being coupled to said variable phase shifter as said control signal.

13. The antenna module of claims 8, 9, 10 or 11 wherein said antenna module includes a first and second slot radiator with said first and second slot radiators extending in spaced apart parallel relationship with one another in said conductive ground plane, and wherein said first and second impedance matching slots of each of said first and second slot radiators are substantially perpendicular to the associated one of said slot radiators, said first impedance matching slots of said first and second slot radiators being substantially colinear with one another and said second impedance matching slots of said first and second slot radiators being substantially colinear with one another.

14. The antenna module of claim 13 further comprising first and second amplifier stages, each said first and second amplifier stages being responsive to a common applied signal and including circuit means for supplying first and second output signals that are substantially 180° out-of-phase with one another, said first and second output signals of said first amplifier stage being coupled to said conductive strips defining said transmission line means that are interconnected with said excitation elements at a first end of said first and second slot radiators, said first and second output signals of said second amplifier stage being coupled to said conductive strips defining said transmission line means that are interconnected with said excitation elements at the second end of said first and second slot radiators; said antenna module further comprising first and second open-circuited transmission lines extending along said surface of said substrate including said antenna excitation elements and extending into said cavity region defined by said conductive shell to supply first and second signals representative of the electromagnetic energy transmitted by said antenna module, said first and second transmission lines exhibiting a length differential substantially equal to one-half wavelength at the frequency of said common applied signal to establish a phase difference of substantially 180° between said first and second signals representative of said electromagnetic energy transmitted by said antenna module; and phase error correction circuitry including a phase detector responsive to said first and second signals representative of said electromagnetic energy transmitted by said antenna module and responsive to a single input signal for supplying an error signal representative of the phase difference between said single input signal and said first and second signals representative of said electromagnetic energy transmitted by said antenna module, phase shifter means connected for receiving said single input signal and said error signal supplied by said phase detector, said phase shifter means including means for altering the phase of said single applied input signal until said error signal supplied by said phase detector is less than a predetermined value, said phase correction circuitry further including means for coupling said phase shifted signal to each of said power amplifier stages as said common applied signal.

* * * * *